(12) United States Patent
Beral et al.

(10) Patent No.: US 8,721,288 B2
(45) Date of Patent: May 13, 2014

(54) TIP-FORMING MEMBER FOR A WHEEL OF A HYDRAULIC MACHINE, AND WHEEL AND HYDRAULIC MACHINE EQUIPPED WITH SUCH A MEMBER

(75) Inventors: Claude Beral, Veurey Voroize (FR); Jean-François Bertea, Saint Jean de Muzols (FR); Rachel Chiappa, Sainte Agnes (FR); Daniéle Bazin, Voiron (FR); Eric Gaudin, Grenoble (FR)

(73) Assignee: Alstom Hydro France, Levallois Perret (FR)

( * ) Notice: Subject to any disclaimer, the term of this patent is extended or adjusted under 35 U.S.C. 154(b) by 760 days.

(21) Appl. No.: 12/920,757

(22) PCT Filed: Mar. 4, 2009

(86) PCT No.: PCT/FR2009/050349
§ 371 (c)(1),
(2), (4) Date: Oct. 6, 2010

(87) PCT Pub. No.: WO2009/115730
PCT Pub. Date: Sep. 24, 2009

(65) Prior Publication Data
US 2011/0020124 A1 Jan. 27, 2011

(30) Foreign Application Priority Data

Mar. 5, 2008 (FR) .................................. 08 51430
Jul. 1, 2008 (FR) .................................. 08 54458

(51) Int. Cl.
*F03D 11/00* (2006.01)
*B63H 1/16* (2006.01)
*B64C 11/00* (2006.01)

(52) U.S. Cl.
USPC .................................................... 416/186 R

(58) Field of Classification Search
USPC ........... 416/37, 40, 41, 44, 53, 104, 110, 111, 416/117, 119, 161, 182, 183, 186, 198 A, 416/205, 186 R
See application file for complete search history.

(56) References Cited

U.S. PATENT DOCUMENTS

| 1,917,037 | A | * | 7/1933 | Jessop et al. ............... 29/889.21 |
| 4,017,211 | A | | 4/1977 | Alestig et al. |
| 4,151,231 | A | * | 4/1979 | Austin et al. .................... 261/91 |
| 5,261,787 | A | * | 11/1993 | Morgunov ................ 415/208.1 |
| 6,523,995 | B2 | * | 2/2003 | Fasano et al. ................. 366/264 |

FOREIGN PATENT DOCUMENTS

| CH | 328203 | 2/1958 |
| EP | 1624184 | 2/2006 |
| FR | 1162872 | 9/1958 |
| FR | 1203142 | 1/1960 |

(Continued)

*Primary Examiner* — Edward Look
*Assistant Examiner* — Christopher J Hargitt
(74) *Attorney, Agent, or Firm* — Buchanan Ingersoll & Rooney PC

(57) ABSTRACT

This member (4) can be attached to the crown (12) of a wheel (1) of a hydraulic machine. It is provided with a skin (42) of which a surface (421) is able to be arranged in the continuation of a wet surface (121) of the crown. This member is equipped with at least one fun (43) arranged radially inside the skirt (42) and projecting axially (h) from the skirt (42) in the downward direction.

17 Claims, 8 Drawing Sheets

(56) References Cited

FOREIGN PATENT DOCUMENTS

| | | |
|---|---|---|
| FR | 2300909 | 9/1976 |
| GB | 799013 | 7/1958 |
| JP | 5564472 A | 5/1980 |
| JP | 04-072468 A | 3/1992 |
| JP | 04072468 | 3/1992 |
| JP | 2006-29227 A | 2/2006 |

* cited by examiner

TIP-FORMING MEMBER FOR A WHEEL OF A HYDRAULIC MACHINE, AND WHEEL AND HYDRAULIC MACHINE EQUIPPED WITH SUCH A MEMBER

BACKGROUND OF THE INVENTION

1. Field of the Invention

The present invention relates to a member that can be attached to the crown of a hydraulic machine. It also relates to a wheel equipped with such a member, and to a hydraulic machine comprising such a wheel.

2. Brief Description of the Related Art

In the field of hydraulic turbines, in particular Francis-type turbines, it is known to equip the part upstream of the crown of a wheel with an axisymmetric member, often termed a "tip", the outer surface of which substantially extends the wet surface of the crown of the wheel, having a diameter which can reduce in a downstream direction. The purpose of this member or "tip" is to extend the guiding of the flow in the direction of the axis of rotation of the wheel. Similarly, it is known to use guide members or tips in turbine pumps and other turbines with blades. In the known hydraulic turbines, the flow traversing the wheel can give rise to vortices or turbulence, generally referred to as a "torche" and which, at certain loads, are corkscrew-shaped. This torche turbulence is problematic in that it causes pressure and/or power fluctuations that can adversely affect the stability of the power supply to the machine, as well as the mechanical performance of this machine.

WO-A-2005/038243 discloses the use of a tip comprising two surfaces which are respectively convergent and divergent in the direction of an axis of rotation of the wheel, which allows the turbulence to be limited to a large extent. However, turbulence persists at certain speeds.

U.S. Pat. No. 4,071,211 furthermore discloses the provision of curved blades on the outer surface of a wheel tip to assist the guiding of the flow when the load on a turbine is greater than the optimum operating conditions for which the wheel is designed. Such a solution is not capable of reducing or eliminating all the instabilities under low load and proves to be complicated to implement as it requires relatively elaborate analysis to define the complex geometry of the blades, and these blades are awkward to manufacture. Furthermore, the positioning of these blades on the outer surface of the tip means that they have a limited influence on the ropes which develop in the immediate vicinity of the axis of rotation of the wheel.

Moreover, GB-A-739 013 describes a Francis wheel equipped with a cone which bears fins arranged radially on the outside of the surface of the cone. At some speeds, these fins can disturb the course of a flow that travels over the outer surface of the cone.

SUMMARY OF THE INVENTION

It is these disadvantages that the invention particularly aims to overcome by proposing a new member that can be attached to the crown of a wheel and which allows the instabilities caused by the turbulent ropes to be reduced and/or eliminated, in particular under low load.

To this end, the invention relates to a member that can be attached to the crown or the hub of a wheel of a hydraulic machine, this member being provided with a skirt, one surface of which can be arranged in the continuation of a wet surface of the crown or the hub. This member is characterized in that it is equipped with at least one fin arranged radially inside the abovementioned skirt, while this fin projects axially in a downward direction, when the member is attached to the wheel, relative to a free lower edge of the skirt that delimits an opening allowing the water to circulate toward or from the internal space of the skirt, and in that the portion of the or each fin that projects in a downward direction relative to the free edge of the skirt makes it possible to affect the flow in the vicinity of the axis of rotation of the wheel.

The fact that the portion of the or each fin that projects beneath the skirt makes it possible to affect the flow in the vicinity of the axis of rotation of the wheel, substantially reduces the vortices or turbulence in this area. It is not necessary for the fin or fins to have a complex blade shape, which makes it easier to design and manufacture a member in accordance with the invention. As the fins are arranged radially inside the skirt, they do not disturb the flow of water over the outer radial surface of the skirt that extends the wet surface of the crown or the hub of the wheel. Thus, acting locally on the vortices or turbulence in the vicinity of the axis of rotation of the wheel does not substantially reduce the overall efficiency of the installation.

The invention also relates to a wheel of a hydraulic machine equipped with a member as described above. Such a wheel has improved hydraulic characteristics and makes it possible to change the hydrodynamic structure of turbulent torches that tend to develop in proximity to its axis of rotation.

Lastly, the invention relates to a hydraulic machine equipped with a wheel as mentioned above. Such a machine can be a turbine, a pump or a turbine pump.

When the member comprises means for adjusting the axial position of the fins relative to the wall, the machine is advantageously equipped with means for activating the adjusting means as a function of parameters of a flow traversing the wheel.

BRIEF DESCRIPTION OF THE DRAWINGS

The invention will be better understood and other advantages of it will become more apparent from the following description of four embodiments of a member and a Francis wheel in accordance with the invention, given purely by way of example and made with reference to the attached drawings, in which.

DESCRIPTION OF THE PREFERRED EMBODIMENTS

Figure 1:
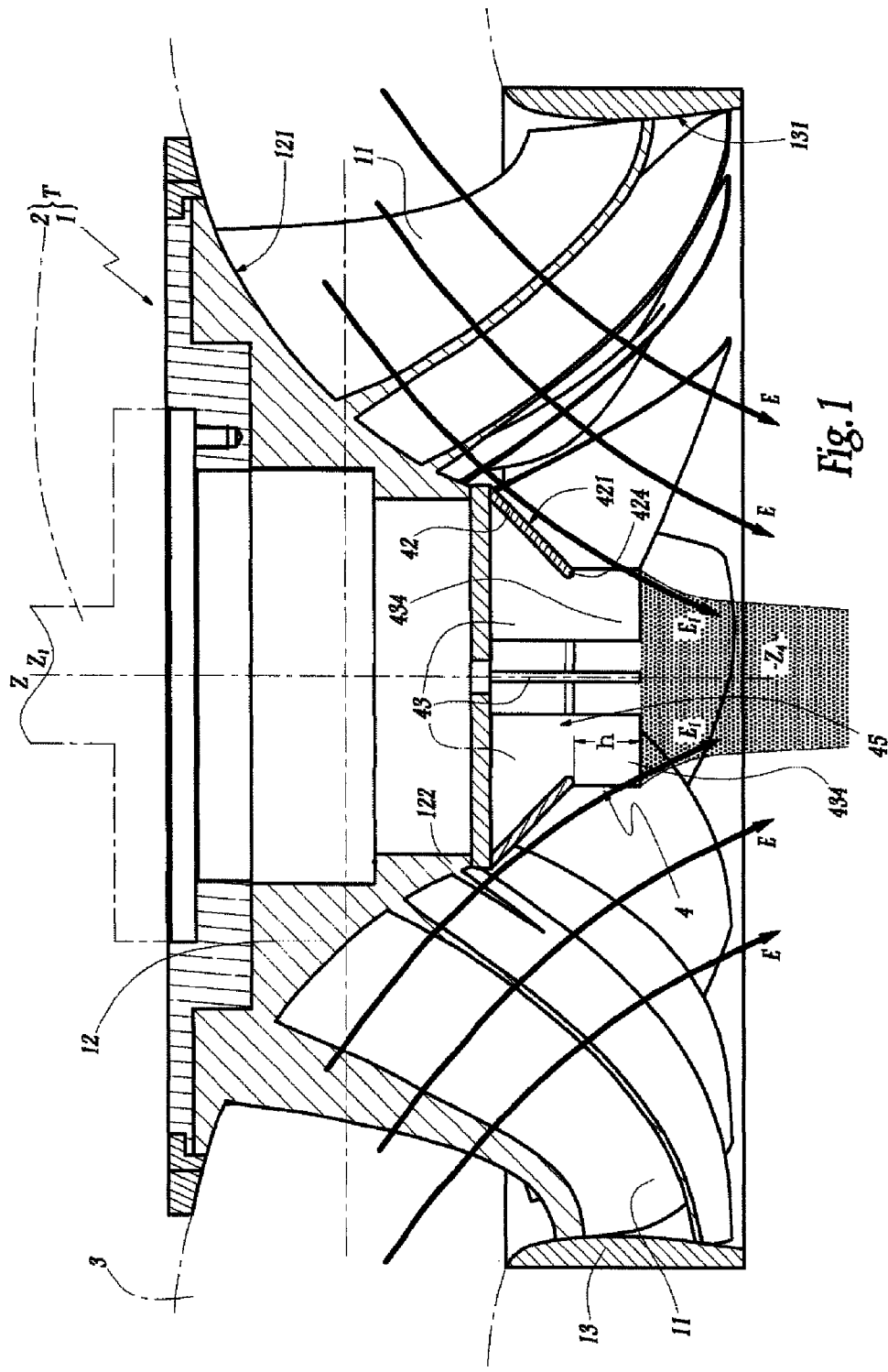
FIG. 1 is an axial cross section of a turbine wheel in accordance with the invention.
Figure 2:
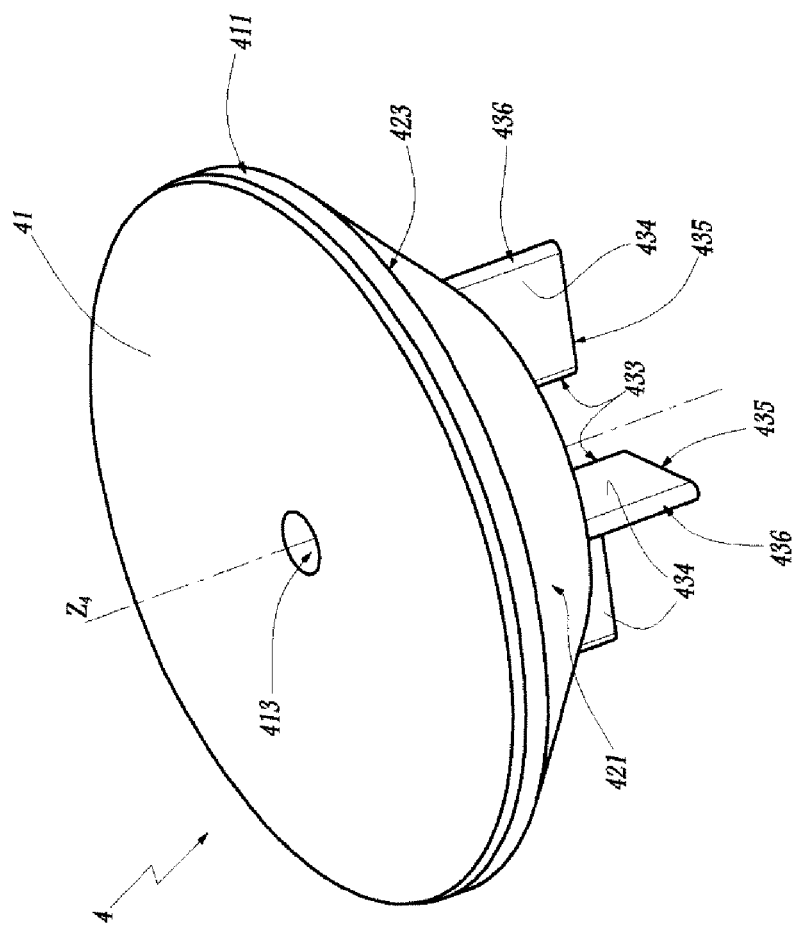
FIG. 2 is a perspective view on a larger scale of the tip of the wheel in FIG. 1.
Figure 3:
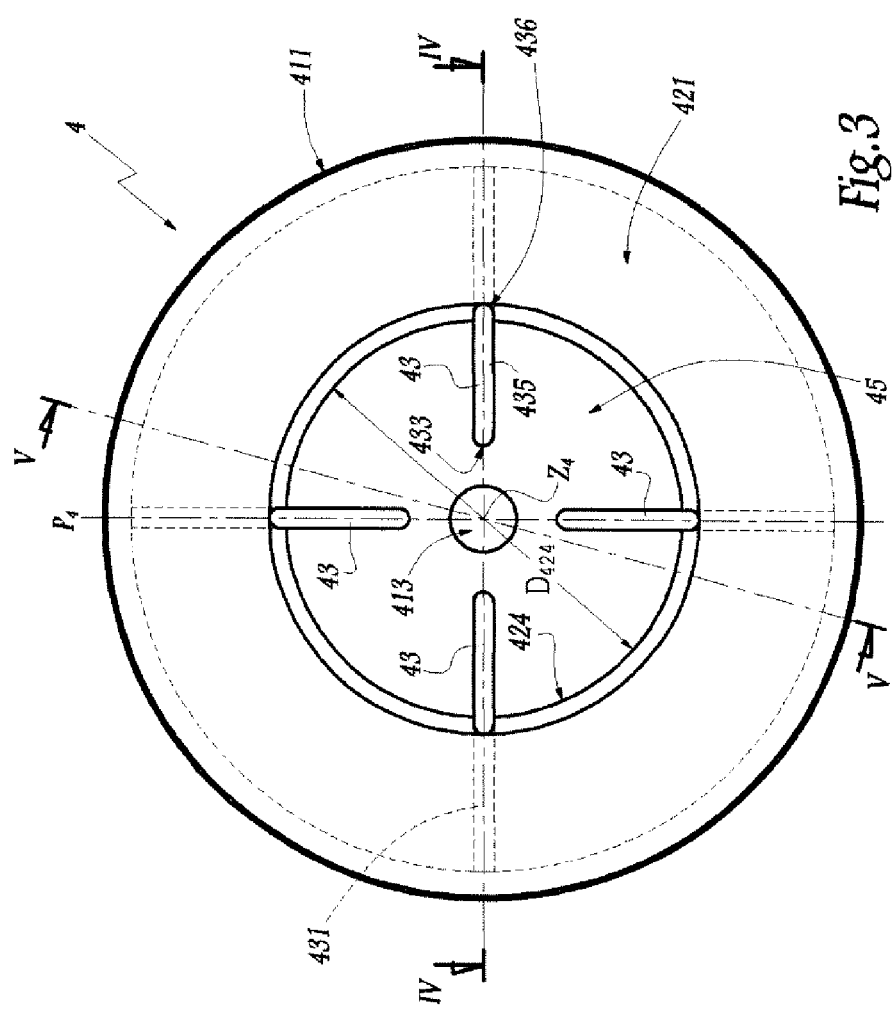
FIG. 3 is a view from below of the tip in FIG. 2.
Figure 4:
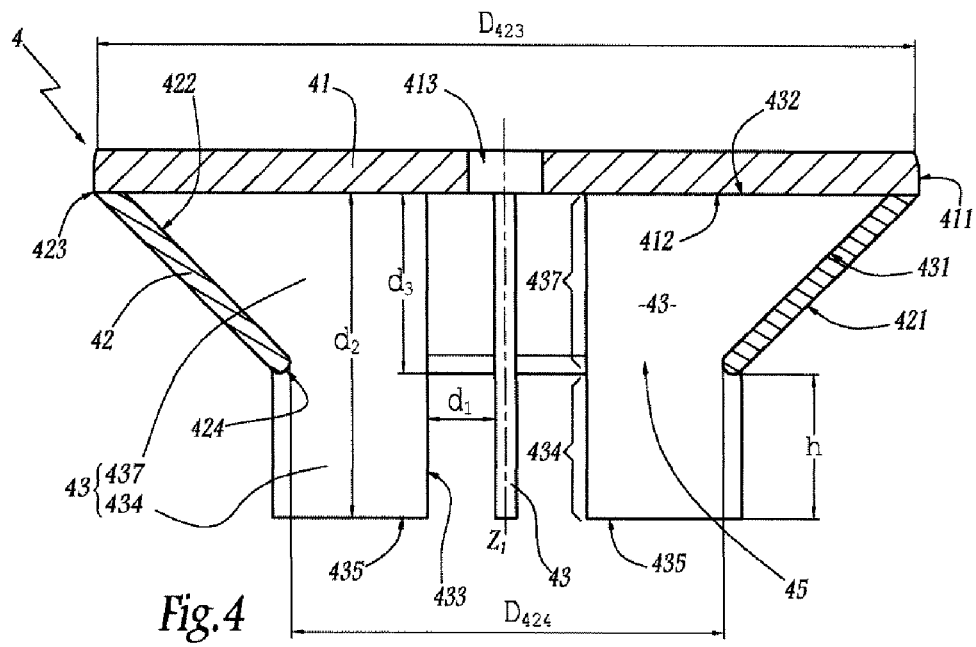
FIG. 4 is a cross section along the line IV-IV in FIG. 3, this cross section corresponding to the representation of the tip in FIG. 1.
Figure 5:
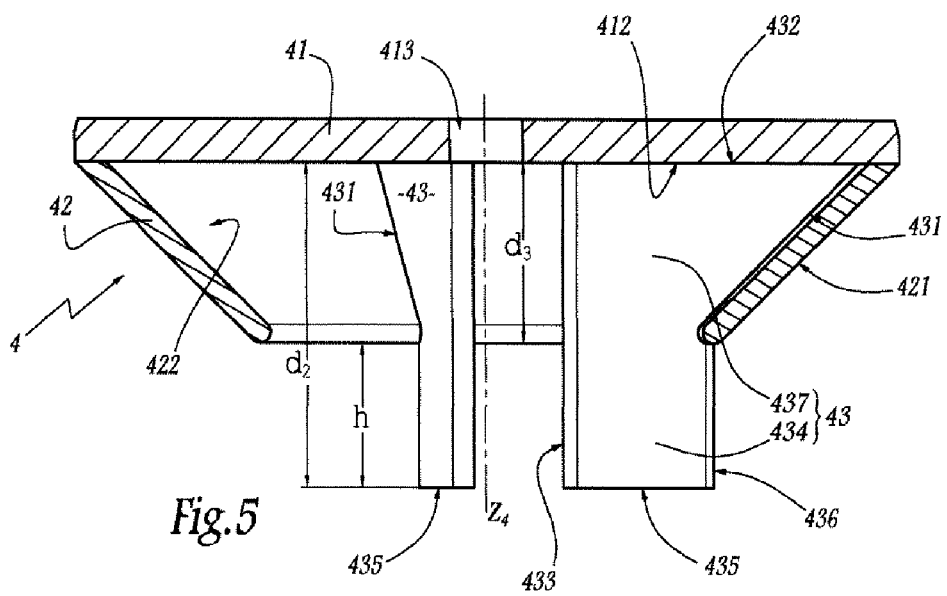
FIG. 5 is a cross section along the line V-V in FIG. 3.

The Francis turbine wheel 1 shown in FIG. 1 is intended to form part of a Francis-type turbine T by being connected to a shaft 2 that can move rotationally about a vertical axis Z. This wheel is supplied from a casing 3 belonging to an installation comprising the turbine T and the purpose of which is to convert the hydraulic energy into electrical or mechanical energy, depending on the equipment to which the upper part of the shaft 2 is joined.

To make the drawing clear, the elements 2 and 3 have been shown in broken lines in FIG. 1.

The wheel 1 comprises blades 11 regularly distributed about the central axis $Z_1$ of the wheel, which coincides with the axis Z in the installed configuration of the turbine T. A crown 12 is provided in the inner upper and radial part of the wheel 1, while a band 13 borders the outer lower and radial parts of the blades 11. A flow passage is created between each pair of two adjacent blades 11, this passage being delimited by the blades 11, by a wet surface 121 of the crown 12 and by a wet surface 131 of the band 13.

A flow E can thus traverse the wheel 1, acting on the blades 11 in order to set said wheel in rotation about the coinciding axes $Z_1$ and Z and hence drive the shaft 2.

A tip-forming member 4 is mounted on the downstream part 122 of the crown 12. This member 4 partially blocks the downstream access to the space $V_{12}$ inside the crown 12, this space having to generally remain accessible, before the member 4 is fitted, in order to mount the wheel 1, in particular to fix it onto the shaft 2, by means of bolts which are not shown.

In what follows, the member 4 is referred to as a "tip", as is customary. The tip 4 comprises a disk-shaped bracket 41 that is intended to be fixed onto the crown 12, for example by means of bolts which are not shown. The tip 4 also comprises a skirt 42 that is centered on an axis $Z_4$, has the shape of a truncated cone, and converges toward the axis $Z_4$ in a direction moving away from the bracket 41. The outer and inner radial surfaces of the skirt 42 are respectively denoted 421 and 422. The skirt 42 is welded to the bracket 41 in the vicinity of its outer radial edge 411.

In the present description, the terms "upward", "downward", "upper", and "lower" correspond to the orientation of the parts of the wheel 1 when the latter is in its use configuration in a vertical-axis turbine T. An "upper" part is thus situated above a "lower" part.

In the mounted configuration of the tip 4 on the wheel 1, the surface 421 extends the surface 121, which contributes to the guiding of the flow E when it traverses the wheel.

The upper edge of the skirt 42 is denoted 423 and its lower edge 424. The diameters of the edges 423 and 424 are denoted $D_{423}$ and $D_{424}$ respectively. The value of $D_{424}$ is less than the value of $D_{423}$.

Four elements 43 in the form of flat fins are arranged in the tip 4 and extend radially inside the skirt 42. Each fin 43 matches the internal shape of the skirt 42 and the lower surface 412 of the bracket 41. In other words, an outer edge 431 of each fin 43 adjoins the inner surface 422 of the skirt 42, while an upper edge 432 of this skirt adjoins the surface 412. Each fin 43 can thus be welded onto the bracket 41 and the skirt 42, radially inside this skirt.

Each fin 43 is centered on a plane $P_4$ which extends radially relative to the axis $Z_4$. Each fin 43 thus extends in a radial direction relative to the axis $Z_4$.

The inner radial edge 433 of each fin 43 is parallel to the axis $Z_4$ and extends by a distance $d_1$ from the axis $Z_4$ that is not zero, allowing access to a central opening 413 in the bracket 41 from below when the tip 4 is mounted on the wheel 1. This permits access to the means for fixing the tip 4 on the wheel 1.

Each fin 43 comprises a portion 434 which projects axially beneath the edge 424 of the skirt 42, in other words which extends beyond the skirt 42, relative to the bracket 41. The lower edge of a portion 434 is denoted 435, this edge being perpendicular to the axis $Z_4$ in the example in FIGS. 1 to 5. The distance, measured parallel to the axis $Z_4$, between the surface 412 and the edge 435 is denoted $d_2$. The distance, likewise measured parallel to the axis $Z_4$, between the surface 412 and the edge 424 is denoted $d_3$. The distance $d_2$ is greater than the distance $d_3$, in such a way that the portion 434 of each fin 43 projects beyond the skirt 42 by a height h equal to the difference between $d_2$ and $d_3$.

Thus, when the tip 4 is mounted on the wheel 1, as shown in FIG. 1, the portions 434 of the fins 43 that project from the skirt 42 in a downward direction allow a movement resulting from the rotation of the tip 4 to be imparted to a part $E_1$ of the flow E, which passes in the vicinity of the surfaces 121 and 421. This makes it possible to substantially reduce, and even eliminate, the vortex torches that tend to develop, in particular under low load, in the vicinity of the axis Z in the shaded area in FIG. 1, downstream of the wet surfaces 121 and 421.

The outer radial edge of a portion 434 is denoted 436. In the example in FIGS. 1 to 5, this edge is straight and parallel to the axis $Z_4$.

The edges 433 and 436 are rounded, having a semi-circular cross section with a radius that is dependent on the thickness of the fins 43.

The portion of each fin situated axially at the level of the skirt 42, in other words between the edges 423 and 424, and radially inside said skirt is denoted 437. The edges 431 and 432 of the portion 437 adjoin the surfaces 422 and 412.

A fin 43 is formed by the combination of its portions 434 and 437.

Figure 6:
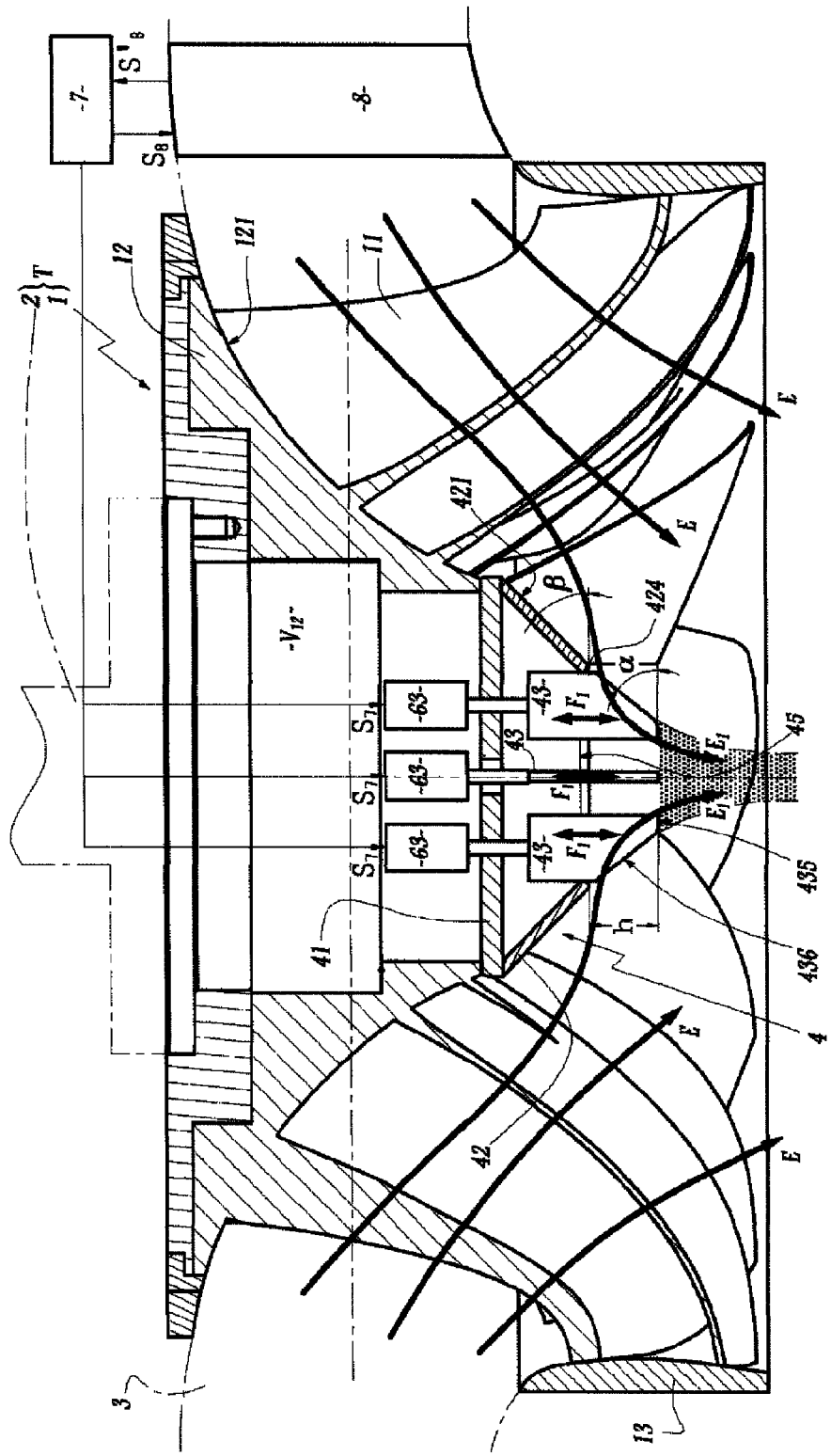
FIG. 6 is a cross section analogous to that in FIG. 1 for a turbine wheel in accordance with a second embodiment of the invention and incorporating a tip in accordance with a second embodiment of the invention.

In the second embodiment of the invention shown in FIG. 6, those elements analogous to those in the first embodiment have the same reference numerals. The essential differences between this second embodiment and the first are described hereinafter. The tip 4 in this embodiment is equipped with four fins 43 that project axially beyond a frusto conical skirt 42 with the shape of a truncated cone, by a height h that can be adjusted by virtue of the fins 43 being mounted movably relative to the bracket 41 and the skirt 42 of the tip 4, as shown by the double-headed arrows $F_1$ in FIG. 6.

The axial position of each fin 43 is controlled by a servomotor 63 that is arranged in the central space $V_{12}$ of the crown 12 and is activated by a unit 7 for controlling the turbine T. This unit 7 can send an activation signal $S_7$, which takes account of the parameters of the flow E in the wheel 1, to each of the servomotors 63. These parameters may include the flow rate or the speed of the water in the flow E, or other parameters.

The unit 7 activates the guide vanes 8 of the installation to which the turbine T belongs by means of a signal $S_8$. The unit 7 can analyze a signal $S'_8$ that tells it the position of a guide vane in order to activate the servomotors 63 as a function of this signal $S_8$. In other words, the signal $S'_8$ giving information about the position of the guide vanes can be interpreted by the unit 7 to control the servomotors by means of the signal $S_7$, since the signal $S_8$ represents the flow E.

If necessary the signals $S_7$ can be individualized so that the relative position of the edge 435 of a fin relative to the edge 424, in other words the height h, can differ from one fin to another.

In this embodiment the axial height h by which the portions 434 of the fins 43 project beyond the skirt 42 can thus be adjusted, whilst the tip 4 is mounted on the wheel 2.

As above, the outer radial edge of the portions 434 is denoted 436. The edge 436 is not parallel to the central axis $Z_4$ of the tip 4 but converges toward this axis in a direction moving toward the lower edge 435 of the fins 43. The half-angle at the vertex a of the edge 436 can be chosen as a function of the half-angle at the vertex β of the surface 421.

Figure 7:
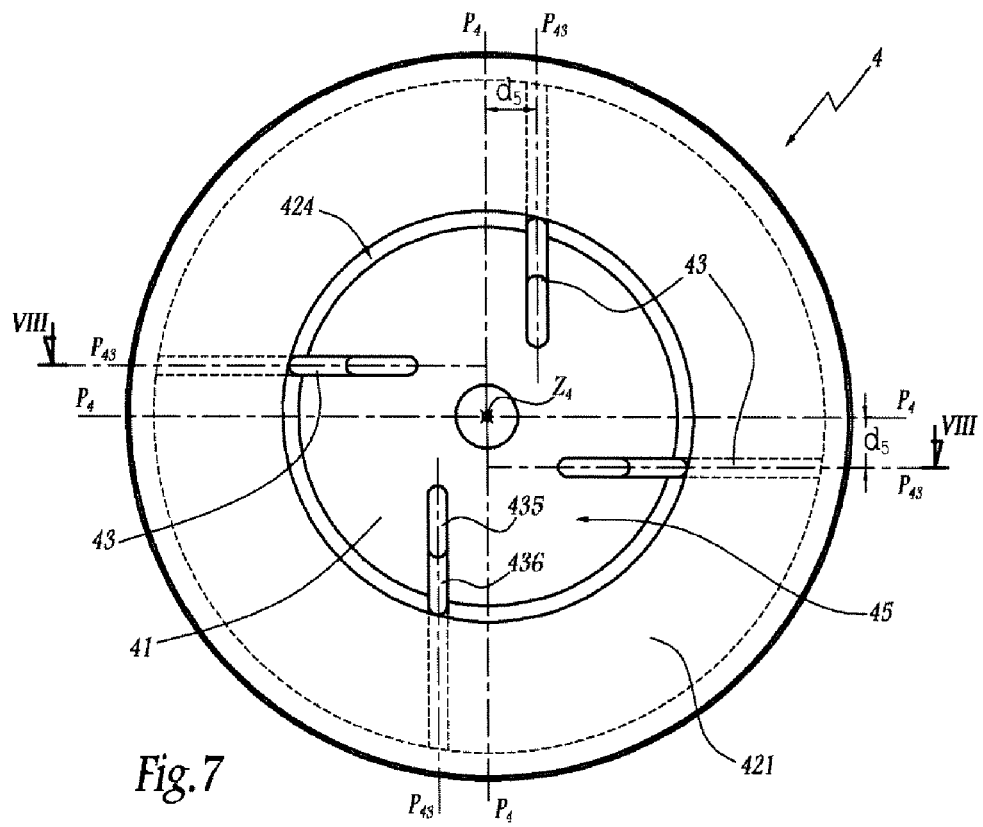
FIG. 7 is a view from below analogous to that in FIG. 3 for a tip in accordance with a third embodiment of the invention.
Figure 8:
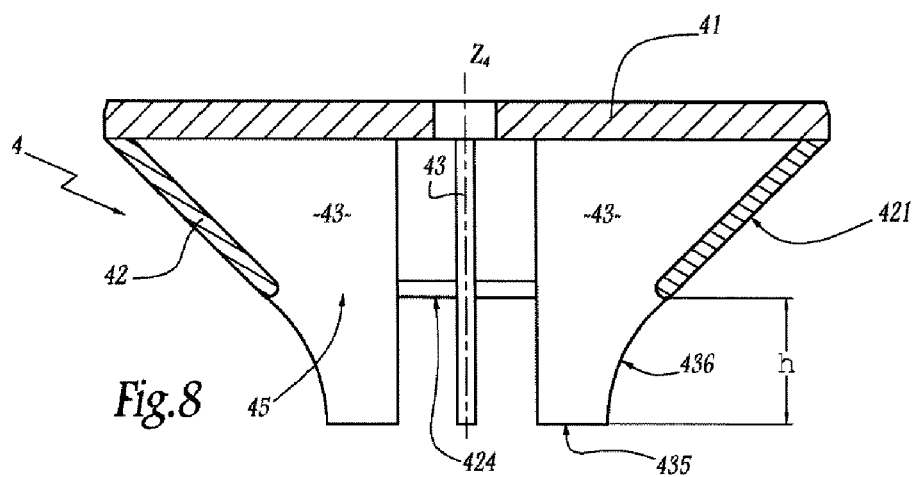
FIG. 8 is a cross section along the line VIII-VIII in FIG. 7.

In the third embodiment of the invention shown in FIGS. 7 and 8, those elements analogous to those in the first embodiment have the same reference numerals. The essential differences between this third embodiment and the first embodiment are described hereinafter. The tip 4 in this embodiment also comprises four fins 43, the portions 434 of which project beyond a frusto conical skirt 42 with the shape of a truncated cone, by a height h that is not zero. The outer radial edge 436 of the portions 434 is curved, in the continuation of the outer surface 421 of the skirt 42.

Furthermore, the fins 43, which are flat, are each centered on a plane $P_{43}$ parallel to a plane $P_4$ that is radial with respect to the central axis $Z_4$ of the tip 4. In other words, the fins 43 are parallel to radial directions corresponding to the planes $P_4$ in the plan view in FIG. 7 but offset laterally relative to these directions by a distance $d_5$ that is not zero.

Figure 9:
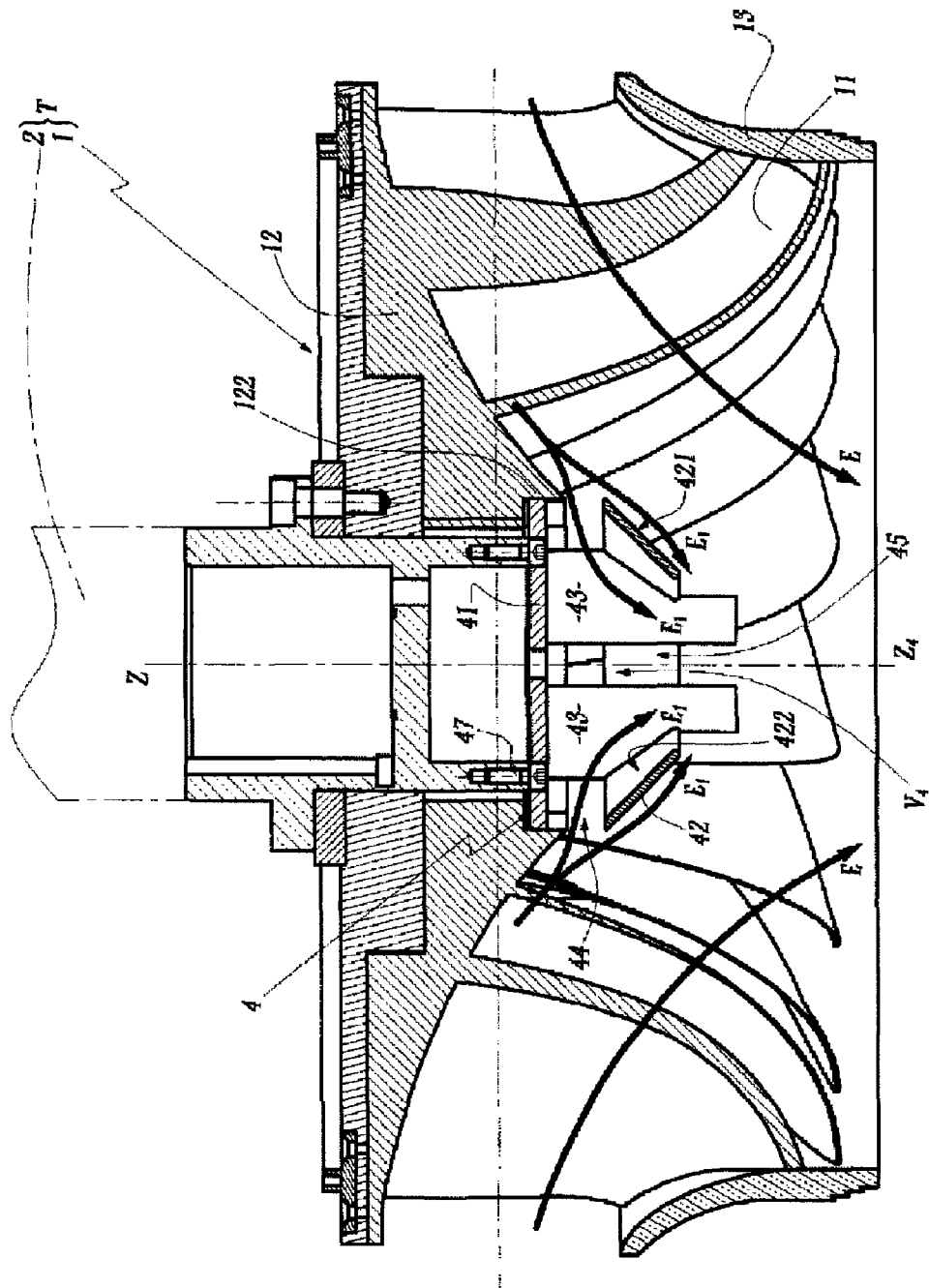
FIG. 9 is an axial cross section analogous to that in FIG. 1 for a wheel in accordance with a fourth embodiment of the invention.
Figure 10:
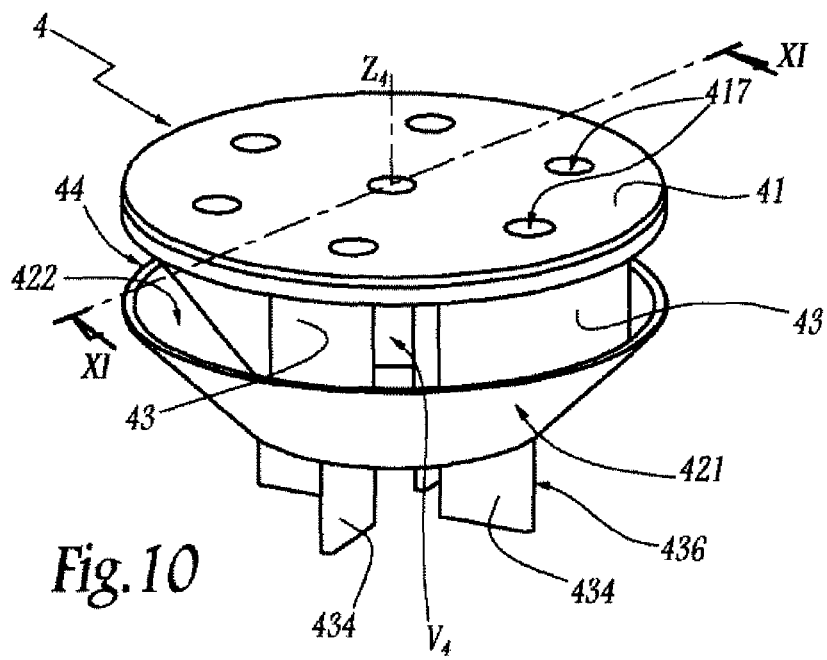
FIG. 10 is a perspective view of the tip of the wheel in FIG. 9.
Figure 11:
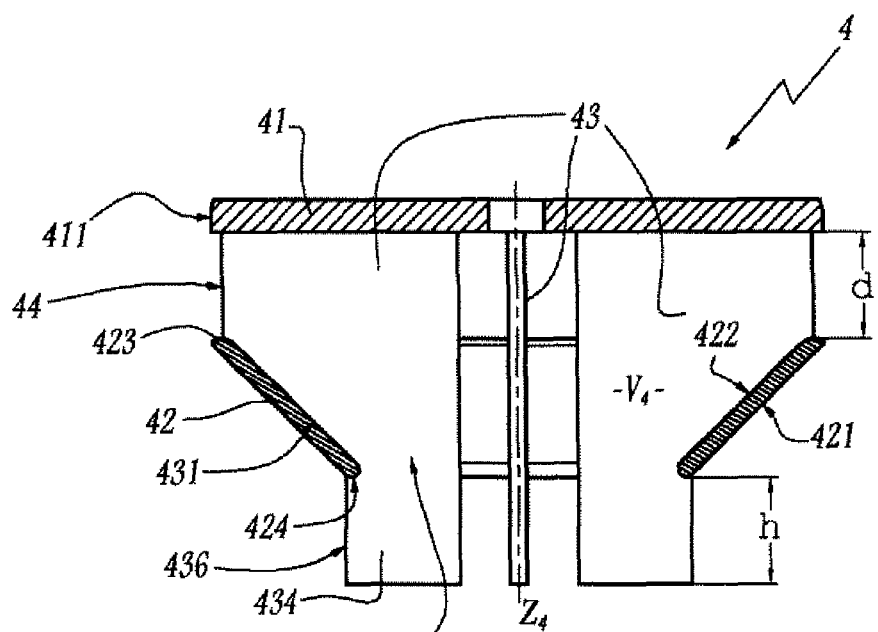
FIG. 11 is a cross section along the line XI-XI in FIG. 10 but on a larger scale.

In the fourth embodiment of the invention shown in FIGS. 9 to 11, those elements analogous to those in the first embodiment have the same reference numerals. The wheel 1 of this embodiment is intended to form part of a Francis-type turbine T by being connected to a shaft 2 that can move in rotation about a vertical axis Z. The wheel 1 comprises blades 11 that extend between a crown 12 and a band 13. The crown 12 defines a wet surface 121 over which a flow E traversing the wheel 1 is intended to travel.

A member 4, which is referred to as a "tip" in what follows, is mounted on the downstream part 122 of the crown 12 and comprises a disk-shaped bracket 41 which is intended to be fixed on the crown 12 by means of screws 47 traversing orifices 417 formed in the bracket 41. Other means for fixing the member 4 on the wheel 1 can be envisaged within the scope of the present invention.

The tip 4 also comprises an annular skirt 42 centered on an axis $Z_4$ intended to coincide with the axis Z in the mounted configuration of the tip 4 and the wheel 1. This skirt has the shape of a truncated cone and converges toward this axis in a direction moving away from the bracket 41. The outer and inner radial surfaces of the skirt 42 are denoted 421 and 422 respectively.

The skirt 42 is suspended from the bracket 41 by four elements 43 in the form of flat fins which each extend parallel in a radial direction with respect to the axis $Z_4$. The skirt 42 is positioned with respect to the crown 12 in such a way that the outer surface 421 is, taken as a whole, in the continuation of the wet surface 121 when the member 4 is mounted on the wheel 1.

In a difference from the first embodiment, an opening 44 is created between the bracket 41 and the skirt 42. The upper edge 423 of the skirt 42 extends by a distance d that is not zero from the outer radial edge 411 of the bracket 41. This distance d is the axial height of the opening 44, measured parallel to the axis $Z_4$. The opening 44 allows a portion $E_1$ of the flow E which travels over the surface 121 to enter the internal space $V_4$ of the tip 4, in other words the internal space of the skirt 42.

The flow $E_1$ passes around the skirt 42, both along the surface 421 and along the surface 422 which, taken as a whole, extend the surface 121 and are slightly offset in a downward direction relative to the latter. The edges 431 of the fins 43 which extend axially at the level of the skirt 42 adjoin its internal surface 422.

In FIG. 9 it should be noted that, given that the tip 4 has been partially inserted into the downstream part 122 of the crown 12, the opening 44 is partially blocked by the part 122.

As in the first embodiment, the fins 43 project beyond the lower edge 424 of the skirt 42 by a height h. The portion of the fins 43 which projects from the skirt 42 in a downward direction, when the tip 4 is attached to the wheel 1 is denoted 434.

In all the embodiments, the outer radial edge 436 of the part 434 of the fins 43 which projects beneath the skirt 42 does not protrude appreciably, radially in a direction moving away from the axis $Z_4$, with respect to the lower edge 424 of the skirt 42. The action of the fins 43 is thus concentrated on the central part of the flow $E_1$ shown in FIGS. 1 and 6 which is directed toward the shaded area in these figures.

In practice, the geometry of the fins 43 in the different embodiments described above is adapted to that of the wheel 1 and to the nature of the flow that traverses it. The invention has been shown with flat fins 43. As a variant, these fins can be curved with a relatively simple geometry.

The number of fins 43 of a tip 4 is not necessarily equal to four. A tip with a single fin may be envisaged, as may a tip with two, three or more than four fins. When several fins are used, they are advantageously regularly distributed about the central axis of the skirt.

According to a variant of the invention that has not been shown, the lower edge 435 of the fins 43 can be other than perpendicular to the axis $Z_4$. In particular, this edge can be oblique or curved, and even form the bottom part of the edge 436.

In the embodiments described above, the outer surface 421 of the skirt 42 converges toward the axis $Z_4$ in a direction moving away from the edge 423, in other words in a direction moving away from the surface 121 in the mounted configuration of the member 4 on the wheel 1. The surface 421 has the shape of a truncated cone with a straight-line generatrix. It could also have a curved generatrix, and could even not converge toward the axis $Z_4$ in a direction moving away from the edge 423.

According to an aspect of the invention which is not shown but which can be deduced easily from the second embodiment, a tip-forming member 4 can be mounted on a wheel 1 so that it can move axially, along the axes Z, $Z_1$, and $Z_4$ which then coincide. This makes it possible to adapt the position of the surfaces 421, and possibly of the fins 43, to the operating conditions of the wheel 1. This movement of the surface 421, in other words of the skirt 42 in the four embodiments, can be obtained by means of servomotors installed in the internal space $V_{12}$ of the crown of the wheel, like the servomotors 63 in the second embodiment.

It is thus possible to "retract" a tip 4 upward so that it no longer protrudes partially or totally into the area through which the flow E from the crown 12 of a wheel 1 passes.

According to a complementary aspect, it can be provided that the fins 43 are also adjustable, in other words movable upward relative to the surface 421 of the member 4. To do this, in the four embodiments some of the fins can be assembled in a rigid manner with the skirt 42 that they support, without projecting beyond this, while other fins can move relative to this skirt and can project beyond this.

The means for adjusting the axial position of the skirt relative to the remainder of the wheel 1 are advantageously activated as a function of the parameters of the flow E traversing the wheel, like the servomotors 63 in the second embodiment.

In all the embodiments, the skirt 42 is open in a downward direction, in the sense that its lower edge is free and defines an opening 45 allowing water to circulate toward or from the internal space of the skirt 42. In the embodiments in FIGS. 1 to 8, the water can recirculate toward this space through the opening 45. In the embodiment in FIGS. 9 to 11, the water that enters this space via the opening 44 leaves it via the opening 45. This allows the parts 437 and equivalents of the fins 43 to act equally on the flow in the vicinity of the axis $Z_1$.

The invention has been shown with a member 4 provided with a disk-shaped bracket 41 for mounting it on a wheel 1. Such a bracket does not necessarily have to be disk-shaped and can be replaced by other parts for connection to the crown or the hub of the wheel.

The invention has been shown with a tip 4 bolted onto the crown 12 of the wheel. Such a tip can be attached to the wheel in a different manner, for example by welding. The invention can also be applied to the case where the tip-forming member forms an integral part of the wheel 1, being a single piece with the crown that it extends.

According to another variant of the invention that is not shown and that can be applied to all the embodiments, the fins 43 can be joined in the central portion of the internal space of the skirt 42. In other words, the fins can meet, their edges 433 then coinciding. They then form parallel channels. These channels can be used to direct the part of the flow $E_1$ passing radially inside the skirt 42, in the embodiment in FIGS. 9 to 11.

The technical features of the different abovementioned embodiments can be combined interchangeably. In particular, the fins of the first, third, fourth and fifth embodiment can be mounted on the tip with the possibility of adjusting their height, as in the case of the fins in the second embodiment.

In this case, and in the second embodiment, it is possible that only some elements are height-adjustable. For example, in the fourth embodiment, two fins can be fixed and support the skirt 42 without projecting beyond the edge 424, while two other fins can move parallel to the axis $Z_4$, relative to both the bracket 41 and the skirt 42.

The invention has been shown applied to a Francis-type wheel. It can, however, be applied to other types of hydraulic machines, and in particular to ptorcheller, Deriaz or Kaplan turbines. In this case, the member according to the invention is coupled to the hub of the turbine or the pump.

The invention claimed is:

1. A flow affecting tip member that for being attached to a downstream part of a crown of a wheel of a hydraulic machine so as to be centrally positioned relative to blades that extend from curved wet surfaces of the crown to wet surfaces of a band, the member comprising a skirt, one surface of the skirt extending downward and inward as a continuation of the wet surface of the crown, at least one fin provided radially inside the skirt and extending axially in a downward direction when the member is attached to the crown, the skirt having a free lower edge that defines an opening allowing water to circulate relative to an internal space of the skirt, and a portion of the at least one fin projects in a downward direction through the opening defined by the free edge of the skirt by a distance (h) to affect water flow in a vicinity of an axis of rotation of the wheel and below the opening when the member is mounted to the crown.

2. The flow affecting tip member as claimed in claim 1, wherein the portion of the at least one fin which projects axially in a downward direction relative to the skirt includes an outer radial edge which does not project in a radial direction from the lower edge of the skirt in a direction away from the axis of rotation of the wheel.

3. The flow affecting tip member as claimed in claim 1, wherein the at least one fin extends parallel to a direction that is radial with respect to an axis of symmetry of the skirt.

4. The flow affecting tip member as claimed in claim 1, wherein an upper portion of the at least one fin extends axially inside the skirt toward the downstream part of the crown.

5. The flow affecting tip member as claimed in claim 4, wherein an edge of the upper portion of the at least one fin which extends inside the skirt adjoins an inner surface of the skirt.

6. The flow affecting tip member as claimed in claim 4, characterized in that an edge of the upper portion of the at least one fin adjoins a surface of a bracket for fixing the member to the crown of the wheel, the surface of the bracket facing downward when the member is attached to the crown.

7. The flow affecting tip member as claimed in claim 6, wherein the at least one fin is welded to the bracket and to the skirt radially inside the skirt when the member is attached to the crown.

8. The flow affecting tip member as claimed in claim 1, including adjusting means for adjusting the distance (h) by which the portion of the at least one fin projects axially from the free lower edge of the skirt.

9. The flow affecting tip member as claimed in claim 8, including adjusting means for adjusting an axial position of the at least one fin relative to the skirt, when the member is attached to the crown.

10. The flow affecting tip member as claimed in claim 1, wherein the skirt is movable relative to the wheel parallel to the axis of rotation of the wheel, when the member is mounted to the crown.

11. The flow affecting tip member as claimed in claims 1, including a plurality of fins, the portion of each fin having an edge that is perpendicular to the axis of rotation of the wheel and extends by the distance (h) from the free lower edge of the skirt.

12. The flow affecting tip member as claimed in claim 1, including a plurality of fins, each fin is provided with a free inner edge that extends parallel to the axis of rotation of the wheel and which extends by a distance ($d_1$) from the axis of rotation of the wheel.

13. The flow affecting tip member as claimed in claim 1, including a plurality of fins and the fins being joined in a central portion of the internal space of the skirt.

14. A wheel for a hydraulic machine equipped with a flow affecting tip member as claimed in claim 1.

15. A hydraulic machine equipped with a wheel as claimed in claim 14.

16. The hydraulic machine as claimed in claim 15, wherein the member includes first adjusting means for adjusting an axial position of the at least one fin relative to the skirt, and in that the machine is equipped with first activation means for activating the first adjusting means for adjusting the axial position of the at least one fin as a function of parameters of a water flow traversing the wheel.

17. The hydraulic machine as claimed in claim 16, including second adjusting means for moving the skirt relative to the wheel parallel to the axis of rotation, and in that the machine is equipped with second activation means for activating the second adjusting means for adjusting a position of the skirt, as a function of parameters of the water flow traversing the wheel.

* * * * *

UNITED STATES PATENT AND TRADEMARK OFFICE
CERTIFICATE OF CORRECTION

PATENT NO. : 8,721,288 B2
APPLICATION NO. : 12/920757
DATED : May 13, 2014
INVENTOR(S) : Beral et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 789 days.

Signed and Sealed this
Twenty-ninth Day of September, 2015

Michelle K. Lee
*Director of the United States Patent and Trademark Office*